United States Patent [19]

Yoshikawa et al.

[11] Patent Number: 4,506,518

[45] Date of Patent: Mar. 26, 1985

[54] COOLING CONTROL SYSTEM AND EXPANSION VALVE THEREFOR

[75] Inventors: Seimi Yoshikawa; Hideo Yamada, both of Ohgaki; Yoichi Okubo, Gifu, all of Japan

[73] Assignee: Pacific Industrial Co. Ltd., Giln, Japan

[21] Appl. No.: 605,487

[22] Filed: Apr. 30, 1984

Related U.S. Application Data

[62] Division of Ser. No. 388,171, Jun. 14, 1982, abandoned.

[30] Foreign Application Priority Data

Jun. 17, 1981 [JP] Japan .................................. 56-94208

[51] Int. Cl.³ ............................................. F25D 17/00
[52] U.S. Cl. ....................................... 62/180; 62/204; 62/227; 251/133
[58] Field of Search .......................... 62/204, 180, 227

[56] References Cited

U.S. PATENT DOCUMENTS

| | | | |
|---|---|---|---|
| 2,956,188 | 10/1960 | White | 310/86 |
| 3,421,700 | 1/1969 | Laine | 239/416 |
| 3,466,476 | 9/1969 | Snowdon | 310/49 |
| 3,894,255 | 7/1975 | Newton, Jr. | 310/80 |
| 4,171,087 | 10/1979 | Kunz | 236/68 R |
| 4,315,413 | 2/1982 | Baker | 62/180 |
| 4,382,578 | 5/1983 | Ruyak | 251/133 X |
| 4,449,375 | 5/1984 | Briccetti | 62/180 X |

FOREIGN PATENT DOCUMENTS

53-1352 1/1978 Japan .
55-6025 1/1980 Japan .

Primary Examiner—William E. Wayner
Attorney, Agent, or Firm—Cushman, Darby & Cushman

[57] ABSTRACT

A cooling control system comprises a cooling apparatus having a refrigerant compressor, a vapor condenser, an expansion valve, an evaporator and a blower, a first temperature detection device for detecting a room temperature, a second temperature detection device for detecting a temperature of the refrigerant which is introduced into the evaporator, a detection device for detecting a temperature difference between a temperature of the refrigerant discharged from the evaporator and the temperature of the refrigerant introduced into the evaporator, and a control device for controlling operations of the compressor as well as the blower and for controlling an opening of the expansion valve in response to the detected inflowing refrigerant temperature, the detected temperature difference and the detected room temperature.

23 Claims, 3 Drawing Figures

COOLING CONTROL SYSTEM AND EXPANSION VALVE THEREFOR

This is a division of application Ser. No. 388,171, filed June 14, 1982, now abandoned.

This invention concerns a cooling control system and an expansion valve for the cooling control system comprising a cooling apparatus having a refrigerant compressor or refrigeration compressor, a vapor condenser, an expansion valve, an evaporator and a blower, as well as a control device for controlling the flow rate of a refrigerant flowing through the expansion valve by the control of an opening of the expansion valve.

In conventional cooling control systems, the amount of a refrigerant circulated through the systems in controlled by a control device in which a pressure P1 in a refrigerant inlet conduit or a pressure P2 in a refrigerant outlet conduit of an evaporator is transmitted to one side of a diaphragm and a pressure P obtained from a temperature detection device utilizing gas expansion that converts a temperature T of the external surface of the refrigerant outlet conduit (generally corresponding to the temperature at the outlet of the evaporator) into the pressure P is transmitted to the other side of the diaphragm, and the diaphragm is displaced in proportion to the pressure difference level (P−P1) or (P−P2) to thereby control the opening of a needle valve used as the expansion valve.

In the cooling control system of this conventional type, however, since only a single parameter, i.e., the difference of pressures exerted on opposite sides of the diaphragm is utilized for detecting the deviation of the operating conditions of the cooling control system from optimal control conditions, and the deformation or displacement of the diaphragm depending on the pressure difference between the opposite sides of the diaphragm is directly transformed into the displacement of the needle valve, it is difficult to control the refrigerant flow rate in wide range. Further, since no sufficient stroke can be set for controlling the opening of the needle valve (for instance only to about 0.5 mm), an extremely small displacement of the needle valve results in a great change in the refrigerant flow rate. Furthermore, since the controllable range for the flow rate is narrow, the cooling control system can be set for the relatively smooth control condition of the refrigerant flow rate only near the rated level of cooling loads. Namely, if the cooling loads are much lower or smaller than the rated level, it is fear that so called hunting phenomena may happen in the needle valve in which the stem of the needle valve violently vibrates between the fully closed state and the fully open state. While on the other hand, if the cooling loads are much higher or larger than the rated level, the needle valve, even at its fully open state, can not allow the refrigerant to pass therethrough at a sufficient flow rate required for the optimal cooling control.

Recently, use of variable capacity of compressors or refrigerant pipeways combined in a complicated manner, which are put under the microcomputer control has also been attempted from an energy saving point of view. In the computer-controlled cooling control system proposed thus far, temperatures of the refrigerant flowing into and out of the evaporator as well as the room temperature are detected, the amount of the circulated refrigerant is controlled by the above-mentioned conventional expansion valve in order to keep the difference of the detected refrigerant temperatures, and the operating conditions of the compressor as well as the blower are controlled by the controller having calculating device such as the microcomputer which serves to compare the detected room temperature with the predetermined reference values. However, in the proposed computer-controlled cooling system, reliable cooling control can not always be obtained for cooling loads varying over a wide range. In addition, since the expansion valve, for example, used therein is of the conventional type, which can not control the flow rate of the refrigerant largely or accurately, it is difficult to control the cooling capacity of the entire cooling circuit largely or widely.

An object of this invention is to provide a cooling control system capable of varying the cooling capacity in a wide range depending on the cooling loads in an area to be cooled.

Another object of this invention is to provide a cooling control system capable of reliable cooling control with a relatively simple structure.

These objects can be attained by a cooling control system comprising a cooling apparatus having a refrigerant compressor, a vapor condenser to condense a refrigerant pressurized by the compressor, an expansion valve means for controlling flow rate of the refrigerant and for expanding the refrigerant condensed by the condenser under pressure, an evaporator for evaporating the expanded refrigerant and a blower for directing fluid to be cooled to the evaporator, a first temperature detection means for detecting a temperature of the fluid to be cooled, a second temperature detection means for detecting a temperature of the refrigerant which is introduced into the evaporator, a detection means for detecting a temperature difference between a temperature of the refrigerant discharged from the evaporator and the temperature of the refrigerant introduced into the evaporator, and a control means for controlling operations of the compressor as well as the blower and for controlling an opening of the expansion valve means in response to the temperature of the refrigerant introduced into the evaporator detected by the second temperature detection means, the temperature difference detected by the temperature difference detection means, and the temperature of the fluid detected by the first temperature detection means.

This invention is to be described in more details referring to the accompanying drawings, by which the foregoing and other objects, as well as the features of this invention will be made clearer in which.

Figure 1:
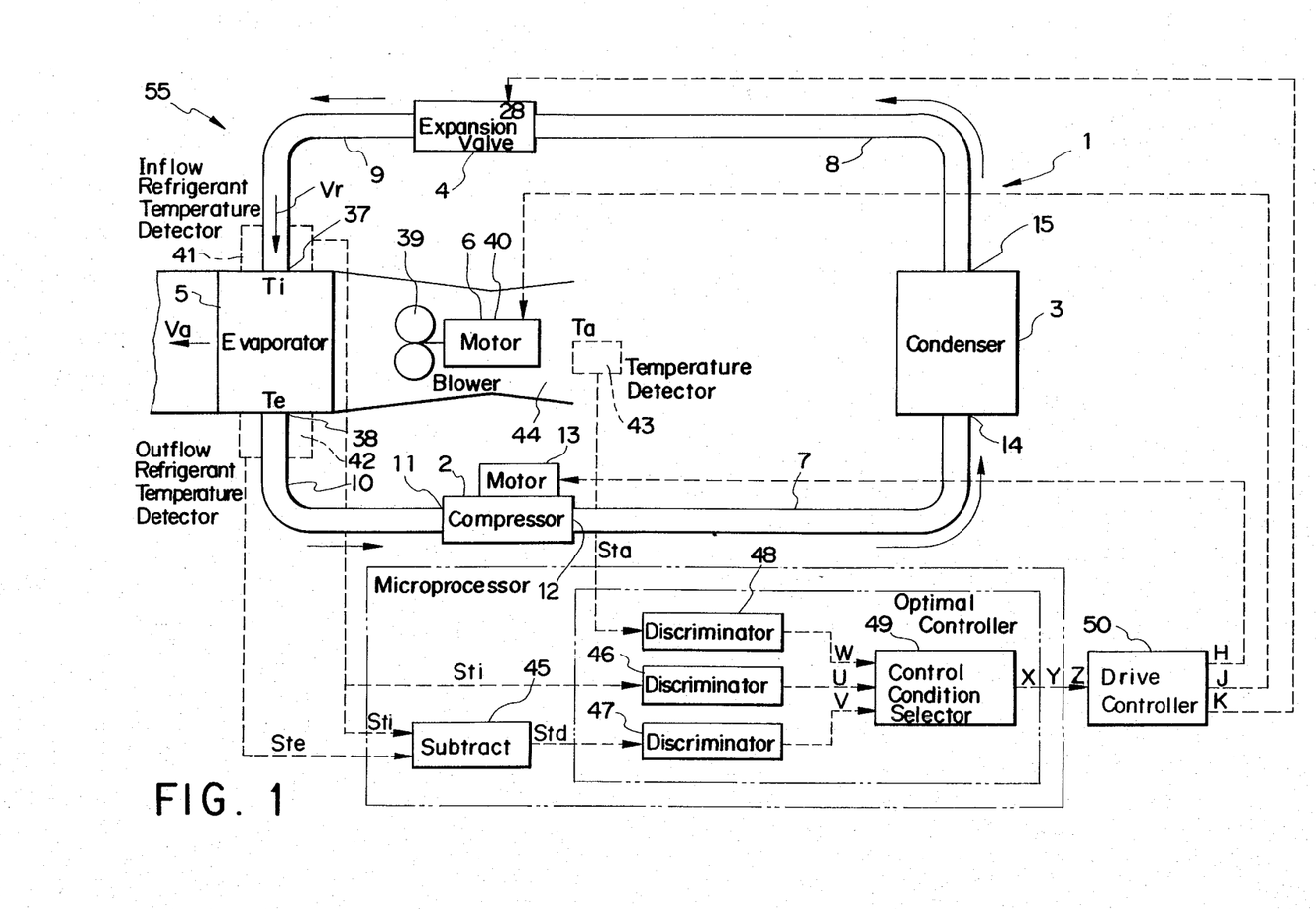
FIG. 1 is a block diagram for a cooling system of a preferred embodiment according to this invention.

In FIG. 1, a cooling apparatus or a cooling circuit generally designated by numeral 1 comprises a compressor 2, a condenser 3, an expansion valve 4 as expansion valve means, an evaporator 5 and a blower 6. In the cooling apparatus 1, pipeway connections are made between the compressor 2 and the condenser 3 with a conduit 7, between the condenser 3 and the expansion valve 4 with a conduit 8, between the expansion valve 4 and the evaporator 5 with a conduit 9 and between the evaporator 5 and the compressor 2 with a conduit 10. In the case where the cooling apparatus 1 is applied, for example, to air cooling of the spaces in building chambers or vehicles, an adequate liquid receiver-dehydrator may be provided to the conduit 8 situated at the outlet of the condenser 3.

The refrigerant compressor or refrigeration compressor 2 comprises a reciprocating compressor adapted to such a gaseous refrigerant at low pressure from the conduit 10 through its suction or inlet port 11 and discharge the gaseous refrigerant at high pressure from its discharge or delivery port 12 to the conduit 7. The reciprocating compressor 2 is driven by an electric motor 13 as a motor means and the amount of the discharged gaseous refrigerant at high pressure discharged from the compressor 2 is increased substantially in proportion to the increase in the rotational speed of the power shaft for the motor 13. If the pressure of the refrigerant in the conduit 7 is below a predetermined level, the compression ratio in the compressor 2 being constituted as the reciprocating compressor is substantially constant irrespective of the rotational speed of the power shaft for the motor 13, on the other hand if the pressure of the refrigerant in the conduit 7 is equal to or above the predetermined level, the compressor 2 operates so as to keep the pressure in the conduit 7 to a predetermined level.

A centrifugal compressor may be used as the compressor 2 instead of the reciprocating compressor and, in this case, the discharged amount and the discharged pressure of the gaseous refrigerant from the centrifugal compressor 2 increase as the rotational speed of the power shaft for the motor 13 increases.

The vapor condenser 3 comprises a heat exchange unit adapted to condense or liquefy the gaseous refrigerant at high temperature and high pressure delivered from the compressor 2 by way of the conduit 7 to its inlet 14 into liquid refrigerant at high pressure and deliver the same from its outlet 15. In the heat exchange unit 3, the refrigerant at high temperature and high pressure is caused to flow, for example, through a heat transfer tube, where it is cooled by heat absorbing fluid such as air or water flowing in contact with the periphery of the heat transfer tube and is usually liquefied under a high pressure defined by the compressor 2. Any known vapor condenser conventionally used for cooling or refrigerating apparatus may be used as the heat exchange unit 3.

The expansion valve 4 is a flow control valve for controlling the flow rate of the refrigerant flowing from the conduit 8 to the conduit 9. The valve 4 defines, together with the compressor 2, a boundary between high pressure sections 7, 3, 8 and low pressure sections 9, 5, 12 in the cooling or refrigerating cycle of the cooling apparatus 1. The valve 4 converts the liquid refrigerant at high pressure in the conduit 8 into refrigerant at relatively low temperature and low pressure and delivers the same by way of the conduit 9 to the evaporator 5. The conduit 9 is, preferably, made short.

Figure 2:
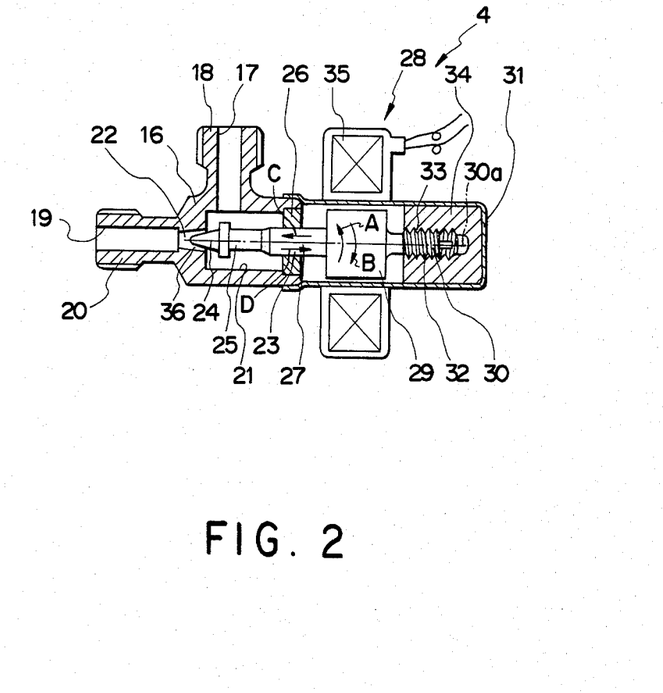
FIG. 2 is an explanatory cross-sectional view of an expansion valve used in the cooling system shown in FIG. 1.

The details of the expansion valve 4 are shown in FIG. 2. A valve body member 16 shown in FIG. 2 comprises an inlet portion 18 having an inlet port 17 to be connected with the conduit 8, an outlet portion 20 having an outlet port 19 to be connected with the conduit 9, a bore 21 communicating the inlet port 17 and the output port 19, and a small aperture 22 of frustoconical shape. The aperture 22 may be formed in cylindrical shape instead of frustoconical shape. A valve stem designated by numeral 23 having a generally conical or frustoconical needle valve portion 24 at its top end comprises a cylindrical stem portion 2 of a small diameter, an intermediate cylindrical stem portion 27 of a relatively large diameter supported rotatably in the directions A, B and slidably in the directions C, D by a bearing portion 26 fixed to the valve body member 16, a stem portion 29 of the largest diameter acting as a rotor of an electric step motor 28 and a cylindrical threaded portion 30 situated at the opposite end remote from the needle valve portion 24. The rotational center axis 30a for the threaded portion 30 is algined with the center axis for the stem portions 25, 27, the rotational center axis for the stem portion 29 and the center axis for the small aperture 22. A bottomed cylindrical member 31 having a thin cylindrical wall and being made of non-magnetic material is fixed in an airtight manner to the valve body member 16 by means of brazing or the like so as to enclose the stem portion 29 and the threaded portion 30. The valve body comprises the valve body member 16, bearing portion 26 and the cylindrical member 31. To the bottom of the cylindrical body 31, is secured a thrust support member 34 having an internal thread part 33 in threading engagement with an external thread part 32 of the thread portion 30 and, to the outer circumference of the cylindrical body 31, is mounted a stator portion 35 for constituting the step motor 28 together with the rotor portion 29 having permanent magnets.

In the expansion valve 4, when a driving or controlling signal is applied to the stator portion 35 of the step motor 28, the threaded portion 30 is rotated together with the stem portion 29 as the rotor by a predetermined angle, for example, in the direction A and the threaded portion 30 is displaced by a predetermined length in the direction C relative to the thrust support member 34 depending on the rotation, whereby the area of the throttling portion, that is, the opening of the valve 4 or the cross-sectional area of the communication passage 36 left between the needle valve portion 24 and the surrounding wall of the small aperture 22 is decreased by a predetermined amount or ratio. While on the other hand, when another driving or controlling signal is applied to the stator portion 35, the rotor portion 29 is rotated by a predetermined angle in the direction B to displace the needle valve portion 24 in the direction D, whereby the opening of the valve 4 is increased by a predetermined amount or ratio. Preferably, the passage 36 having generally annular cross-section is made such that the radial thickness of the annular cross-section is sufficiently smaller as compared with the circumferential length of the annular cross-section even if the opening of the valve is set to its maximum degree. As the result, when the needle valve portion 24 is displaced by a predetermined amount E in the direction C or D, that is, the rotor portion 29 is rotated by a predetermined angle F in the direction A or B, the opening of the valve 4 is decreased or increased by substantially a constant ratio G. The ratio of the change in the opening means herein the ratio of the change in the opening of the valve 4 relative to the maximum opening of the valve 4 represented by the unit of percentage.

The opening of the expansion valve 4 is linearly dependent on the axial displacement of the valve stem 23 or on the rotational angle or rotational displacement of the threaded portion 30, that is, the rotational angle of the stem 23, and the flow rate of the refrigerant flowing through the expansion valve 4 is in proportion to the rotational angle of the valve stem 23, in the case where the difference between the pressure of the refrigerant at the inlet port 17 and that at the outlet port 19 of the expansion valve 4 is kept constant.

The expansion valve 4 in FIG. 2 may be constituted such that the threaded portion 30 has an internal thread and the thrust support member 34 has a complementary external thread.

Further, although a constituent elements of the valve 4 are arranged in the order of the needle valve portion 24, the bearing portion 26, the rotor 29 and the external thread portion 30 from the left in FIG. 2, those elements may be arranged in another order, for example, of the needle valve portion 24, the external thread portion 30, the rotor 29 and the bearing portion 26. Further, in both cases, the bearing portion 26 may be omitted by providing the function of the bearing to the internal thread portion 33 meshing with the external thread portion 32 situated intermediate of the stem 23.

Furthermore, the stator 35 of the motor 28 may be accommodated in the cylindrical portion 31 by increasing the diameter of the portion 31. The flow control stroke of the needle valve 24 in the directions C, D may be set to any desired extent. For instance, the expansion valve 4 may be constituted such that the stroke for the proportional flow control area is set to 5 mm in the directions C, D and the needle valve 24 is displaced in the directions C, D each by 0.25 mm stroke on every input of one driving or controlling signal to the stator 35 of the step motor 28. In the expansion valve 4 illustrated in FIG. 2, since the valve stem or shaft 23 is rotated by an angle in porportion to the number of the driving or controlling signals, for instance number of pulses, supplied to the motor 28 and the valve stem 23 is also displaced leftwardly or rightwardly by the cooperation of the thread portions 32, 33 accompanying therewith, the flow rate of the refrigerant, that is, the opening of the valve 4 can finely or precisely be controlled substantially continuously over the entire range from the fully open (maximum) state to the fully closed (zero) state.

In addition, since the valve stem 23 is kept stationary due to the engaging friction between the thread portions 32, 33, when no driving or controlling signal is applied to the step motor 28, the valve 4 can be maintained at a constant flow rate control condition with no particular external power or energy supply.

The evaporator 5 comprises a heat exchange unit adapted to evaporize the liquid refrigerant at low temperature and low pressure or the liquid refrigerant at low temperature and low pressure partially containing gaseous refrigerant which is introduced from the conduit 9. In the heat exchange unit 5, the liquid refrigerant at low temperature and low pressure, as it flows from the inlet 37 to the outlet 38 through heat transfer tubes, absorbs heat from the atmospheric air caused to flow on the periphery of the heat transfer tubes by the blower 6 and, at the same time, is evaporized by the absorbed heat and then discharged from the outlet 38 to the conduit 10.

The blower 6 comprises a fan 39 for supplying or directing the air in the space of a building or a vehicle to be cooled to the evaporator 5 and a motor 40 for rotating the fan 39.

Any known refrigerant such as Freon 12 ($CF_2Cl_2$) can be used as the refrigerant for the cooling apparatus 1 depending on its application use.

The heat absorption amount Qr from the atmospheric air to the refrigerant passing through the evaporator 5 is increased as the difference Tra (=Ta−Tr) between a temperature Ta of the atmospheric air to be cooled (room temperature) and a temperature Tr of the refrigerant passing through the evaporator 5 and a flow rate Va of the atmospheric air introduced into the evaporator 5 for cooling are greater. The temperature difference Tra is greater as the temperature Ta for the atmospheric air is higher and the temperature Tr of the refrigerant passing through the evaporator 5 is lower, that is, as temperatures Ti and Te of the refrigerant at the inlet 37 and the outlet 38 of the evaporator 5 are lower. In order to maintain the temperature Te as well as the temperature Ti low, it is required to increase the flow rate Vr of the refrigerant passing through the evaporator 5.

The cooling capacity for each of the elements 2, 3, 4, 5, 6 of the cooling apparatus 1 is determined depending on the various thermal loads in the space to be cooled such as the volume of the space filled with the atmospheric air to be cooled and the heat generation amount in the space for cooling the atmospheric air so as to maintain the temperature Ta of the atmospheric air between a lower temperature level Ta0 (for example, 25° C.) and a higher temperature level Ta1 (for example, 28° C.) as first reference temperature levels.

In order to cool the atmospheric air at a temperature Ta above the upper temperature limit Ta1 as the higher first reference temperature level by the cooling apparatus 1, the apparatus 1 has the cooling capacity as define below.

(a) In order to cool the atmospheric air at high temperature rapidly, the flow rate Va of the air to be cooled is increased, which requires to increase the rotational speed of the power shaft of the motor 40 for the blower 6.

(b) It is also preferred to increase the heat absorption amount Qr as much as possible by setting the temperature difference Tra large. In order to increase the temperature difference Tra, a temperature Tr of the refrigerant passing through the evaporator 5 has to be lowered and, for keeping the temperature Tr at a lower level, it is at least necessary to keep the temperature Ti at the inlet 37 of the evaporator 5 to a low level. In order to attain the above purpose, the pressure of the refrigerant in the evaporator 5 is lowered by decreasing the opening of the expansion valve 4 and/or by increasing the rotional speed of the output shaft of the motor 13 for the compressor 2 to suck the refrigerant in the evaporator 5 at higher rate, which results in the decrease of the evaporating or boiling temperature of the refrigerant in the evaporator 5. When the suction power of the compressor 2 is enhanced, the flow rate of the refrigerant circulating the cooling circuit increases, which also results in the enhancement of the cooling capability or cooling capacity.

In the case where the temperature difference Tra is sufficiently great, that is, the temperature Ti of the refrigerant inflowing to the evaporator 5 is below a lower temperature limit Ti0 (for example, −10° C.) as a lower second reference temperature level, it is considered that the compressor 2 sufficiently pressurizes the refrigerant and the rotational speed of the power shaft for the motor 13 of the compressor 2 may be maintained at a medium level.

While on the other hand, it is desired to effectively utilize the cooling capacity of the apparatus 1 in order to save the amount of energy consumed in the cooling operation of the apparatus 1 as much as possible. From the energy saving point of view, the apparatus 1 is, desirably, controlled as specified below.

(c) In the case where the temperature Ti of the refrigerant inflowing to the evaporator 5 is lower than an upper temperature limit Ti1 (for example, 0° C.) as a higher second reference temperature level, it is considered that the refrigerant has a relatively sufficient temperature difference Tra with respect to the atmospheric air at the inlet 37 of the evaporator 5. What is important in this case is whether the refrigerant is kept at a sufficiently low temperature to cool the atmospheric air throughout the entire area of the evaporator 5. The degree of lowness in the temperature of the refrigerant can be judged according to the temperature Te of the refrigerant at the output 38 of the evaporator 5, that is, a temperature difference $Td = Te - Ti$.

(c. 1) In the case where the temperature difference Td is lower than a predetermined lower limit or level Td0 (for example, 5 degree in Celsius unit) as a lower reference temperature difference, it is considered that the refrigerant flows out of the outlet 38 at a sufficiently low temperature Te to cool the atmospheric air. In this case, the refrigerant at low temperature is effectively utilized for the cooling of the atmospheric air by restricting the flow rate Vr of the refrigerant flowing through the evaporator 5, that is, the opening of the expansion valve 4 is decreased by a desired ratio or amount.

(c. 2) In the case where the temperature difference Td is greater than a predetermined upper limit or level Td1 (for example 10 degree in Celsius unit) as a higher reference temperature difference, it is considered that the temperature difference Tra between the refrigerant and the atmospheric air is decreased before the refrigerant arrives at the outlet 38, thereby becoming difficult to cool the atmospheric air with such refrigerant. In this case, the opening of the expansion valve 4 is increased by a desired or predetermined ratio and the flow rate Vr of the refrigerant passing through the evaporator 5 is increased in order to lower the temperature Tr or Te.

(c. 3) In the case where the temperature difference Td lies between the lower level Td0 and the upper level Td1, it is considered that the heat is efficiently absorbed from the atmospheric air into the refrigerant, that is, the energy consumed in the compressor 2 for enabling cooling with refrigerant is efficiently used for the cooling of the atmospheric air with the refrigerant. Accordingly, the opening of the expansion valve 4 is kept as it is in this case.

(d) In the case where the temperature Ti of the refrigerant inflowing to the evaporator 5 is higher than a predetermined upper temperature limit Ti1, it cannot be considered that the refrigerant inflowing to the evaporator 5 is at a sufficiently low temperature to cool the atmospheric air. Accordingly, the flow rate Vr of the refrigerant is decreased irrespective of the temperature difference Td.

In the case where the temperature Ta of the atmospheric air to be conditioned goes lower than the predetermined lower temperature limit Ta0, the cooling apparatus is controlled, irrespective of the temperature Ti of the inflowing refrigerant and the temperature difference Td, such that the operation of the compressor 2 is stopped, the opening of the expansion valve 4 is decreased gradually each by a predetermined ratio and the blower 6 is set to make the atmospheric air flow at a relatively low flow rate Va, in order to avoid excess or wasteful cooling by the cooling apparatus 1. Then, when the temperature Ta of the atmospheric air is kept below the predetermined lower temperature limit Ta0 at least for a while, the expansion valve 4 is finally fully closed and the blower 6 supplies only weak wind.

A temperature detector designated by numeral 41 is adapted to detect the temperature Ti of the refrigerant inflowing to the evaporator 5 and send a signal Sti representing the temperature Ti. This detector 41 as the second temperature detection means is disposed at the inlet 37 of the evaporator 5. A temperature detector designated by numeral 42 is adapted to detect the temperature Te of the refrigerant outgoing from the evaporator 5 and send a signal Ste representing the temperature Te. This detector 42 as the third temperature detection means is disposed at the outlet 38 of the evaporator 5. A temperature detector designated by numeral 43 is adapted to detect the temperature Ta of the atmospheric air in the room, for example, to be cooled and send a signal Sta representing the temperature Ta. This detector 43 as the first temperature detection means is disposed at the introduction or guide passage of the air to be cooled to the blower 6. Each of the temperature detectors 41, 42, 43 comprises, for example, a thermistor. Any other known temperature detector or sensor may be used, if required, together with appropriate transducer as the temperature detectors 41, 42, 43 depending on the temperature and the temperature range to be controlled or detected.

A subtractor or subtracting device designated by numeral 45 is adapted to receive the signals Sti and Ste representing the temperatures of the refrigerant from the detectors 41 and 42 respectively, determine the temperature difference $Td = Te - Ti$ and send a signal Std representing the temperature difference Td. The temperature detector 41 and the subtractor 45 constitute the temperature difference detection means. The subtractor 45, preferably, contains an analog-to-digital converter and sends out the temperature difference signal Std in the form of binary digital signal. A temperature difference detector such as thermocouple that directly detects the temperature difference Td and delivers the same as a voltage signal Std may be provided instead of the combination of the temperature detector 42 and the subtractor 45.

The signals Sti, Std and Sta corresponding to the temperatures Ti, Te and Ta respectively which are detected by the temperature detectors 41, 42 and 43 and converted, as required, into the temperature difference Td, are applied to discriminators 46, 47 and 48 respectively.

The discriminator 46 as the second discriminator means comprises a converter that converts the signal Sti into binary digital data representing the temperature Ti and a comparator that compares the value of the thus converted data Sti with the predetermined reference temperature levels Ti0 and Ti1 (Ti0 < Ti1). The discriminator 46 delivers a signal U1 for Ti ≦ Ti0, a signal U2 for Ti0 < Ti < Ti1 and a signal U3 for Ti ≧ Ti1 each in the form of binary digital signal (the signals U1, U2 and U3 are hereinafter collectively referred to as a signal U). Specifically, the discriminator 46 judges or discriminates whether the temperature Ti of the refrigerant inflowing to the evaporator 5 is not greater than the predetermined lower temperature limit Ti0, not less than the predetermined upper temperature limit Ti1 or within a preferred temperature range between Ti0 and Ti1.

The discriminator 47 as the third discriminator means comprises a comparator that compares the value of binary digital data Std representing the temperature difference Td with the predetermined temperature difference levels Td0 and Td1 and delivers a signal V1 for Td≦Td0, a signal V2 for Td0<Td<Td1 and a signal V3 for Td≧Td1 each in the form of binary digital signal (the signals V1, V2 and V3 are hereinafter collectively referred as a signal V). The discriminator 47 judges or discriminates whether the difference Td between the temperature Te of the refrigerant outgoing from the evaporator 5 and the temperature Ti of the refrigerant inflowing to the evaporator 5, that is, the degree of temperature rise resulted in the refrigerant upon passing through the evaporator 5, is not greater than the predetermined lower temperature difference Td0, not less than the upper temperature difference Td1 or within a preferred temperature difference range between Td0 and Td1.

The discriminator 48 as the first discriminator means comprises a converter that converts the signal Sta into binary digital data representing the temperature Ta of the air to be cooled and a comparator that compares the value of the thus converted data Sta with the predetermined reference temperature levels Ta0 and Ta1 (Ta0<Ta1), and delivers a signal W1 for Ta≦Ta0, a signal W2 for Ta0<Ta<Ta1 and a signal W3 for Ta≧Ta1, each in the form of binary digital data (the signals W1, W2 and W3 are hereinafter collectively referred to as a signal W). The discriminator 48 judges or discriminates whether the temperature Ta of the air in the space to be cooled is not greater than the predetermined lower temperature limit Ta0, not less than the predetermined upper temperature limit Ta1 or within a preferred temperature range between Ta0 and Ta1.

The discrimination signals U, V and W for the temperature Ti of the inflowing refrigerant, temperature difference Td and the temperature Ta of the atmospheric air to be cooled respectively delivered from the discriminators 46, 47 and 48 are applied to a control condition selector 49. The control condition selector 49 comprises a judging table for selectively changing the operational conditions of the compressor 2, the blower 6 and the expansion valve 4 depending on the status of the signals U, V and W or a sort of decision table for the optimal control, that is, logic circuits and delivers control signals X, Y and Z for the control of the compressor 2, the blower 6 and the valve 4 depending on the status of the signals U, V and W.

TABLE 1

| | Optimal Control Table | | | | | | | | |
|---|---|---|---|---|---|---|---|---|---|
| | Ta (W) | | | | | | | | |
| | less than/equal to 25 (W1) | | | 25 to 28 (W2) | | | more than/equal to 28 (W3) | | |
| | Td (V) | | | | | | | | |
| Ti (U) | less than/equal to 5 (V1) | 5 to 10 (V2) | more than/equal to 10 (V3) | less than/equal to 5 (V1) | 5 to 10 (V2) | more than/equal to 10 (V3) | less than/equal to 5 (V1) | 5 to 10 (V2) | more than/equal to 10 (V3) |
| less than/equal to −10 (U1) −10 to 0 (U2) | Compressor: Stop (X1) Blower: Weak (Y1) Valve: Decrement (Z1) | | | Compressor: Medium (X2) Blower: Medium (Y2) Valve: Decrement (Z1) | Compressor: Medium (X2) Blower: Medium (Y2) Valve: Keep (Z2) | Compressor: Medium (X2) Blower: Medium (Y2) Valve: Increment (Z3) | Compressor: Medium (X2) Blower: Full (Y3) Valve: Decrement (Z1) Compressor: Full (X3) Blower: Full (Y3) Valve: Decrement (Z1) | Compressor: Medium (X2) Blower: Full (Y3) Valve: Keep (Z2) Compressor: Full (X3) Blower: Full (Y3) Valve: Keep (Z2) | Compressor: Medium (X2) Blower: Full (Y3) Valve: Increment (Z3) Compressor: Full (X3) Blower: Full (Y3) Valve: Increment (Z3) |
| more than/equal to 0 (U3) | | | | Compressor: Medium (X2) Blower: Medium (Y2) Valve: Decrement (Z1) | | | Compressor: Full (X3) Blower: Full (Y3) Valve: Decrement (Z1) | | |

The Table 1 illustrates an example where Ti0=−10° C., Ti1=0° C., Td0=5 degree (centigrade), Td1=10 degree (centigrade), Ta0=25° C. and Ta1=28° C. In the Table 1, the statuses X1, X2 and X3 of the control signal X correspond respectively to the stop of the operation, the medium level of operation and the full level of operation for the compressor 2, the statuses Y1, Y2 and Y3 of the control signal Y correspond respectively to the supply of weak wind, medium wind and strong wind from the blower 6 and the statuses Z1, Z2 and Z3 of the control signal Z correspond respectively to decreasing, maintaining and increasing the opening of the expansion valve 4.

Reference numeral 50 represents a drive controller adapted to give electric energy as driving signals H, J and K to the motor 13 for the compressor 2, the motor 40 for the blower 6 and the motor 28 for the expansion valve 4 respectively according to the status of the control signals X, Y and Z. The drive controller 5 issues discrimination instruction signals for the discriminators 46, 47 and 48 to perform the next or succeeding discrimination operation, simultaneously with or after the elapse of a predetermined time from the issue of the driving signals H, J and K.

The discriminators 46, 47 and 48 and the control condition selector 49 constitute the optimal controller.

The subtractor 45, the discriminators 46, 47 and 48 and the control condition selector 49 may be constituted with a microprocessor or a microcomputer incorporating a microprocessor. In the case of using a microcomputer, as shown in FIG. 3, the temperatures Ta, Ti and Te are read in by way of an input channel or input feature at a first step 51, the temperature difference Td is determined at a second step 52, Ti, Td and Ta are compared with their respective upper and lower temperature limits at a third step 53, at the fourth step 54 the control conditions for the operation of the compressor 2, the blower 6 and the expansion valve 4 are selected and the selected status of control signals X, Y and Z are delivered to the drive controller 50, according to the results of the comparison, and the next procedure is repeated from the step 51 after the completion of the fourth step 54.

Figure 3:
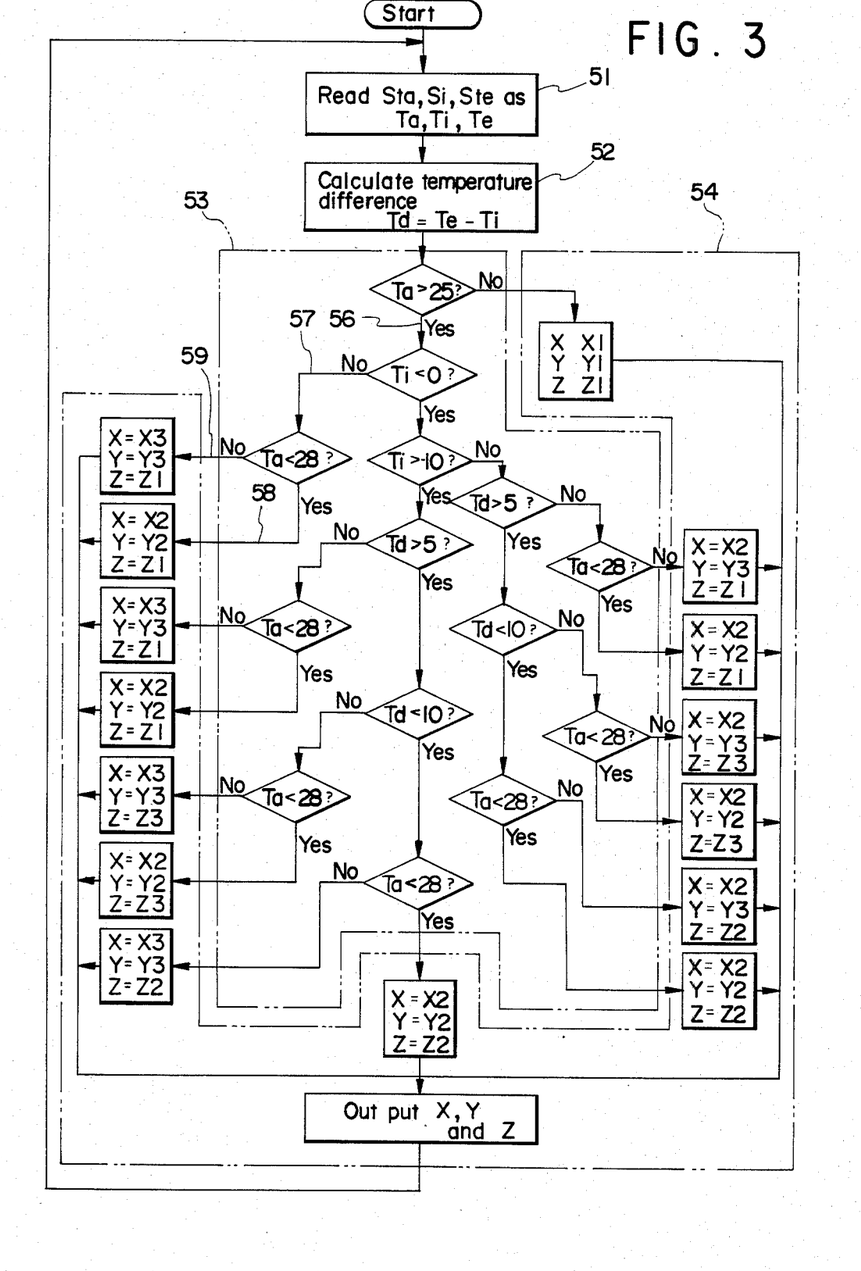
FIG. 3 is a flow chart for the cooling control performed by a microprocessor in a case where the microprocessor is applied to the cooling control system shown in FIG. 1.

As apparent from Table 1 or FIG. 3, in the cooling system 55 as a preferred embodiment according to this invention constituted as above, all of the compressor 2, the blower 6 and the expansion valve 4 are controlled based on the signals Sti, Std and Sta that represent the temperature Ti of the inflowing refrigerant temperature, the temperature difference Td between the refrigerant inflowing to and outgoing from the evaporator 5 and the temperature Ta of the atmospheric air to be cooled so that the cooling apparatus 1 may effectively perform cooling operation as set forth below:

(1) In the case where Ta≦Ta0 (Ta0=25° C.) (air to be cooled is at a sufficiently low temperature)

The operation of the compressor 2 is stopped irrespective of the magnitude of Ti and Td, the blower 6 is controlled so as to feed weak wind and the opening of the valve 4 is decreased by a certain ratio, 5% for example. Accordingly, the valve 4 is fully closed when its operation is controlled under this condition successively for utmost 20 times.

(2) In the case where Ta>Ta0

(2-1) Ti≧Ti1 (Ti1=0° C.) (refrigerant is at an excessively high temperature)

As apparent from the Table 1 or the branches 56, 57, 58 or 56, 57, 59 in FIG. 3, the opening of the valve 4 is decreased by a certain ratio on every judgement by the controller or the microcomputer.

(2-2) Ti<Ti1 (inflowing refrigerant is not at an excessively high temperature)

The opening of the valve 4 is decreased each by the certain ratio, maintained constant or increased each by the certain ratio depending on the temperature difference satisfying the condition of Td≦Td0, Td0<Td<Td1 or Td≧Td1 (Td0=5 degree, Td1=10 degree).

(2-3) Ta0<Ta<Ta1 (Ta1=28° C.) (air to be cooled is at an appropriate temperature)

The compressor 2 set to the medium level of operation and the blower 6 is controlled so as to feed medium wind.

(2-4) Ta>Ta1 (the air to be cooled is at an excessively high temperature)

The blower 6 is controlled so as to feed strong wind.

(2-4-1) Ti≦Ti0 (Ti0=−10° C.) (inflowing refrigernat is at a sufficiently low temperature)

The compressor 2 is set to the medium level of operation.

(2-4-2) Ti>Ti0 (inflowing refrigerant temperature is not always sufficiently low)

The compressor 2 is set to the full level of operation.

For instance, in the case where Ta=29° C., Ti=−2° C. and Te=5° C., Ta being room temperature, that is, the temperature of the atmospheric air to be cooled, Ti being temperature of the refrigerant at the inlet 37 of the evaporator 5 and Te being the temperature of the refrigerant at the outlet 38 of the evaporator 5, since the temperature difference Td=7 degree, the condition corresponds to the operational condition (2-4-1) and the operational condition (2-2) where Td0<Td<Td1 and the compressor 2 is set to the full level of operation, the blower 6 is controlled so as to feed strong wind and the opening of the valve 4 is maintained as it is.

As described above specifically, since the cooling system 55 is operated so as to control all of the operations of the compressor 2, the blower 6 and the valve 4 in mutual relationship based on the temperatures Ta and Ti and the temperature difference Td, it is possible to operate the cooling circuit, that is, the cooling apparatus 1 under optimal conditions, whereby the energy can be saved and the comfortability in the room or the like can be maintained or further improved. In addition there is little fear that the cooling elements such as the compressor 2 may be overloaded. Furthermore, when the opening of the expansion valve 4 is linearly dependent of the displacement of the valve stem 23, the cooling by the system 55 is precisely and largely controlled.

Other operating conditions of the cooling circuit or apparatus 1 such as the temperature of the refrigerant delivered from the compressor 2 may be detected for the control of the apparatus 1.

What is claimed is:

1. A cooling control system comprising a cooling apparatus having a refrigerant compressor, a vapor condenser to condense refrigerant pressurized by the compressor, an expansion valve means for controlling flow rate of the refrigerant and for expanding the refrigerant condensed by the condenser under pressure, an evaporator for evaporating the expanded refrigerant, and a blower for directing fluid to be cooled to the evaporator, a first temperature detection means for detecting a temperature of the fluid to be cooled, a second temperature detection means for detecting a temperature of the refrigerant which is introduced into the evaporator, a detection means for detecting a temperature difference between a temperature of the refrigerant discharged from the evaporator and the temperature of the refrigerant introduced into the evaporator, and a control means for controlling operations of the compressor as well as the blower and for controlling an opening of the expansion valve means in response to the temperature of the refrigerant introduced into the evaporator detected by the second temperature detection means, the temperature difference detected by the temperature difference detection means, and the temperature of the fluid detected by the first temperature detection means.

2. A cooling control system according to claim 1, wherein the temperature difference detection means comprises a third temperature detection means for detecting the temperature of the refrigerant discharged from the evaporator, and a subtraction means for calculating difference between the temperature detected by the second temperature detection means and the temperature detected by the third temperature detection means.

3. A cooling control system according to claim 1, wherein the control means comprises a first discriminator means for comparing the temperature detected by the first temperature detection means with at least one first reference temperature level, a second discriminator means for comparing the temperature detected by the second temperature detection means with at least one second reference temperature level, a third discriminator means for comparing the temperature difference detected by the temperature difference detection means with at least one reference temperature difference level, and a control condition selector for controlling operations of the compressor as well as the blower and for controlling the opening of the expansion valve means according to the comparisons by the first, second and third discriminator means.

4. A cooling control system according to claim 3, wherein the first discriminator means compares the temperature detected by the first temperature detection means with two first reference temperature levels, the second discriminator means compares the temperature detected by the second temperature detection means with two second reference temperature levels, and the third discriminator means compares the temperature difference detected by the temperature difference detection means with two reference temperature difference levels.

5. A cooling control system according to claim 4, wherein the control condition selector is adapted to stop the operation of the compressor and to make the blower generate weak wind when the temperature detected by the first temperature detection means is not greater than a lower temperature level of said two first reference temperature levels according to the comparison by the first discriminator means.

6. A cooling control system according to claim 5, wherein the control condition selector is adapted to decrease the opening of the expansion valve means when the temperature detected by the first temperature detection means is not greater than the lower temperature level of the first reference temperature levels according to the comparison.

7. A cooling control system according to claim 4, wherein the control condition selector is adapted to decrease the opening of the expansion valve means when the temperature detected by the first temperature detection means is greater than a lower temperature level of said two first reference temperature levels, and when the temperature detected by the second temperature detection means is not less than a higher temperature level of said two second reference temperature levels according to the comparisons by the first and second discriminator means.

8. A cooling control system according to claim 4 wherein when the temperature detected by the first temperature detection means is greater than a lower temperature level of said two first reference temperature levels and when the temperature detected by the second temperature detection means is less than a higher temperature level of said two second reference temperature levels according to the comparisons by the first and second discriminator means, a control condition selector is adapted to decrease the opening of the expansion valve means when the detected temperature difference is not greater than a lower temperature difference level of said two reference temperature difference levels according to the comparison by the third discriminator means, to keep the opening as it is when the detected temperature difference is greater than the lower temperature difference level, and less than a higher temperature difference level of said two reference temperature difference levels according to the comparison, and to increase the opening of the expansion valve means when the detected temperature difference is not less than the higher temperature difference level according to the comparison.

9. A cooling control system according to claim 4, wherein the control condition selector is adapted to make the compressor in medium level of operation and to make the blower generate medium level of wind when the temperature detected by the first temperature detection means is greater than a lower temperature level of said two first reference temperature levels and less than a higher temperature level of said two first reference temperature levels according to the comparison by the first discriminator means.

10. A cooling control system according to claim 4, wherein the control condition selector is adapted to make the blower generate strong wind when the temperature detected by the first temperature detection means is not less than a higher temperature level of said two first reference temperature levels according to the comparison by the first discriminator.

11. A cooling control system according to claim 10, wherein the control condition selector is adapted to make the compressor in medium level of operation, when the temperature detected by the first temperature detection means is not less than the higher temperature level, and when the temperature detected by the second temperature detection means is not greater than a lower temperature level of said two second reference temperature levels according to the comparisons by the first and second discriminator means.

12. A cooling control system according to claim 10, wherein the control condition selector is adapted to make the compressor in full level of operation, when the temperature detected by the first temperature detection means is not less than the higher temperature level, and when the temperature detected by the second temperature detection means is greater than a lower temperature level of said two second reference temperature levels according to the comparisons by the first and second discriminator, means.

13. A cooling control system according to claim 1, wherein the control means comprises a microprocessor.

14. A cooling control system according to claim 1, wherein the opening of the expansion valve means linearly depends on displacement of a valve stem thereof with respect to a valve body thereof.

15. A cooling control system according to claim 14, wherein the expansion valve means comprises
the valve body having a threaded portion
the valve stem having a valve portion to change the opening of the expansion valve means in cooperation with the valve body when the valve stem is axially displaced with respect to the valve body, the valve stem further having a threaded portion engaged with the threaded portion of the valve body and being axially displaced with respect to the valve body when the valve stem is rotated around an axis of the threaded portion thereof, and a motor means coupled to the control means, the motor means having a stator portion fixed to the valve body and a rotor portion fixed to the valve stem in order to rotate the valve stem around the axis of the threaded portion thereof.

16. A cooling control system according to claim 15, wherein the rotor portion is rotated by a certain angle in response to a control signal given from the control means to the motor means.

17. A cooling control system according to claim 15, wherein the opening of the expansion valve means is linearly dependent on the rotational angle of the stem.

18. A cooling control system according to claim 17, wherein the valve portion is generally conical in shape.

19. A cooling control system according to claim 18, wherein the valve portion comprises a needle valve.

20. A cooling control system according to claim 15, wherein the threaded portion of the valve body comprises an internal thread part, and the threaded portion of the valve stem comprises an external thread part.

21. A cooling control system according to claim 15, wherein the valve stem has the threaded portion at a remote end thereof from the valve portion.

22. A cooling control system according to claim 21, wherein the valve body has a bearing portion supporting the valve stem at an intermediate portion thereof between the valve portion and the threaded portion of the valve stem.

23. A cooling control system according to claim 15, wherein the control means comprises a microprocessor.

* * * * *